US006047834A

United States Patent [19]

Dölle et al.

[11] Patent Number: 6,047,834

[45] Date of Patent: Apr. 11, 2000

[54] PROCESS FOR THE MANUFACTURE OF A SIFTING DEVICE WITH SLIT-SHAPED OPENINGS AND AN APPROPRIATELY MANUFACTURED SIFTING DEVICE

[75] Inventors: Klaus Dölle, Nattheim; Rudolf Kleinert; Joachim Nittke, both of Dettingen; Reimund Rienecker, Heidenheim; Peter Schweiss, Thalfingen; Gerhard Veh, Höchstädt, all of Germany

[73] Assignee: Voith Sulzer Stoffaufbereitung GmbH, Ravensburg, Germany

[21] Appl. No.: 08/839,181

[22] Filed: Apr. 23, 1997

[30] Foreign Application Priority Data

| | | | |
|---|---|---|---|
| May 24, 1996 | [DE] | Germany | 296 09 298 U |
| Mar. 8, 1997 | [DE] | Germany | 197 09 582 |

[51] Int. Cl.[7] .............................. B07B 1/49; B23P 11/00

[52] U.S. Cl. .......................... 209/395; 209/411; 29/515; 29/896.62; 29/902; 210/415; 210/497.2

[58] Field of Search .............................. 209/393, 395, 209/411; 29/514, 515, 896.62, 896.6, 902; 210/415, 497.01, 497.2

[56] References Cited

U.S. PATENT DOCUMENTS

| | | | |
|---|---|---|---|
| 1,937,274 | 11/1933 | Hoyle et al. . | |
| 4,846,971 | 7/1989 | Lamort | 209/395 X |
| 5,011,065 | 4/1991 | Musselmann | 209/411 X |
| 5,090,721 | 2/1992 | Lange | 29/163.6 X |
| 5,094,360 | 3/1992 | Lange | 209/411 X |
| 5,237,154 | 8/1993 | Pellhammer et al. | 29/897.15 X |
| 5,387,340 | 2/1995 | Ackerman | 210/498 X |
| 5,394,600 | 3/1995 | Chen | 29/447 |
| 5,476,588 | 12/1995 | Nagaoka | 29/902 X |

FOREIGN PATENT DOCUMENTS

| | | |
|---|---|---|
| 3327422 | 2/1985 | Germany . |
| 4214061 | 11/1993 | Germany . |
| 3927748 | 3/1994 | Germany . |

OTHER PUBLICATIONS

European Search Report in connection with European Application No. 97 10 4439.

*Primary Examiner*—Tuan N. Nguyen
*Attorney, Agent, or Firm*—Greenblum & Bernstein, P.L.C.

[57] ABSTRACT

Process for manufacturing a sifting device (or strainer baskets) for use in, e.g., in the paper industry for sorting and/or filtering fiber pulp suspensions. Sorter slits may be created between a plurality of substantially parallel rods inserted into respective insets formed in a support element. The rods may be securely held in place by first inserting the rods into the insets and then by permanently bonding the placement of the rods in the support elements with a bonding agent, e.g., as hard-soldering or brazing.

24 Claims, 3 Drawing Sheets

PROCESS FOR THE MANUFACTURE OF A SIFTING DEVICE WITH SLIT-SHAPED OPENINGS AND AN APPROPRIATELY MANUFACTURED SIFTING DEVICE

CROSS-REFERENCE OF RELATED APPLICATION

The present invention claims the priority under 35 U.S.C. § 119 of German Patent Application (Utility Model - Gebrauchsmuster) No. 296 09 298.3 filed on May 24, 1996, and German Patent Application No. 197 09 582.8-45 filed on Mar. 8, 1997, the disclosures of which are expressly incorporated by reference herein in their entireties.

BACKGROUND OF THE INVENTION

1. Field of the Invention

The present invention relates to a process for manufacturing a sifting device having slit-shaped openings. The process may include forming insets (e.g., recesses or openings) in at least one support element, inserting a plurality of rods, substantially parallel to each other, in the at least one support element and forming filtering slits (or gaps) between the rods. The rods may be permanently bonded in insets of the at least one support element with a bonding agent. The inserted rods may have a shape or profile to securely hold a position of the rods within the at least one support element during subsequent manufacturing.

An example of an application for a sifting device, such as the device to be manufactured by the above process, may be in sorting fiber pulp suspension. The fibers contained in a suspension pass through a sieve while undesired solid constituents are shunted off or diverted by the slit and removed from the sifting device. An application for the separation of different fiber constituents is also conceivable. The suspension may include similar contents of fibrous particles and cubical particles, however, the fibrous particles may pass more easily through the sieve than the cubical particles because the openings may be substantially longitudinal in form, e.g., as slits or gaps. Further, very good separation of non-fibrous interfering materials from fiber suspensions may be possible with separation technology of this type. However, high-precision slit-shaped openings over the entire sifting surface may be necessary.

2. Discussion of Background Information

DE 39 27 748 A1 describes a process, similar in general to the above described process, that produces a strainer basket in which rod sections are fastened by a plastic deformation of retainer rings with insets for the rods. Specially designed rod sections, having a predetermined profile or shape, are used in production processes of this type. With the aid of this process, it is possible to reduce production costs significantly. However, strainer baskets of this type suffer from several drawbacks and limitations.

Sieves and strainer baskets with good stability and high surface quality can be produced according to a process that is described in DE 42 14 061 A1. A high-temperature soldering process is used to mount the rod-like sections. The results are favorable, however, the process is laborious and expensive.

Sieves and strainer baskets similar in general to the above described devices have been discussed in German patent document DE 33 27 422 A1 in which filter slits are shaped by essentially parallel rod-like sections welded to support transverse ribs. However, this process makes it difficult to firmly mount the rods and support ribs. Further, even if a firm mount of the rods to the support ribs is made, the substantial cost due to the precision requirements prevents this process from being preferable because all material surfaces that contact the pulp have to be extremely smooth to avoid the adhesion of fibers to the sifting device during operation. This is the best manner for preventing accumulation and clogging of fibers at this location. Although it has been suggested that such weld seams could later be smoothed or covered, such measures generally only serve to increase production costs.

SUMMARY OF THE INVENTION

An object of the present invention may be to create an economical process for manufacturing sifting devices to exhibit optimal stability and surface characteristics.

This object may be achieved by a process that includes forming insets (e.g., recesses or openings) in a at least one support element, inserting a plurality of rods, substantially parallel to each other, in the at least one support element and forming filtering slits (or gaps) between the rods. The process may also include permanently bonding each rod in a respective inset of the at least one support element with a bonding agent. The rods may be shaped to be securely held in a position in the at least one support element during subsequent manufacturing steps.

An advantage of the present invention may be seen in rod sifting devices having sorting-slit width magnitudes of less than, e.g., approximately 2 mm. In fiber sorting or washing processes, slit widths of approximately 0.1–0.2 mm may be common. Sieves of this type may be equipped with a plurality of rods to provide an adequate sieving surface with the narrow slits. For this reason, preparation for the manufacturing process may be very costly. It may be possible to use specialized devices manufactured in series, however, these devices may also be extremely labor-intensive and expensive. In contrast, the process according to the present invention may include rods placed in position, e.g., by simple insertion, however, the rods may remain fixed and in position until a bonding agent sets them permanently in place. Thus, a bond may be provided for the rods within the insets strong enough to avoid any unintentional change in position that may occur during handling processes following insertion. Such handling may include, e.g., transportation and movement of a half-finished product. The bonding agent may create a permanent bond on a contact surface, as in, e.g., soldering, bonding, and welding. Further, in a pure welding process, which uses a contact electrode, the bonding agent may include the melted material of the component parts.

A soldering process, e.g., hard-soldering at temperatures of between approximately 1000° C. and 1200° C., may be advantageously utilized in manufacturing sifting devices of the type generally described above. Alternatively, a process may be used that utilizes high temperatures of, e.g., approximately 1000° C. to 1200° C. in a vacuum, such that the bonding of the rod materials and the support elements may occur by diffusion of the solder into the areas to be bonded. This may create a very stable device with a substantially flawless surface. However, the above-noted soldering process may require a rather large initial investment.

Glueing may be viewed as an economical bonding method alternative because it may be performed at relatively low temperatures. If, for example, a technical two-component bonding agent is used, the bonding strength may be preserved. This may offset any possible weakening of the glue bond connection. If drawn section lengths or profiles are utilized as the rods, e.g., steel or steel alloy, special cross-sectional shapes may be available at a low cost and a high degree of precision.

If the tolerances of the insets and rods are relatively tight, a sufficiently stable fit may be created simple by inserting the rods into the support element. Support elements that already achieve their final shape when the rods are inserted may then be used. This process may be somewhat more expensive but produces sieving devices having uniform slits that may be a decisive advantage in the sorting of fiber pulp suspensions during paper production. If larger fitting tolerances are allowed, the process cost may be generally reduced. However, deformation of the support elements, i.e., after inserting the rods may be necessary to ensure a secure fit. The bonding strength created by the deformation of the support elements may be weakened or lost during the process step in which the bonding agents take effect. However, this does not generally represent a disadvantage for the finished sifting device because the soldering provides excellent stability. High-temperature vacuum soldering, discussed above, may be particularly well-suited for this step.

A special instance may be seen during an enlargement of the insets by an elastic deformation of the support elements before the rods are inserted or pushed in. Relieving this instance, i.e., reversing the deformation, results in both a stable fit and quality characteristics in sifting devices manufactured in this manner. It is not necessary that the tolerances be as tight as in the non-deformation method. The elastic deformation may also be kept to a minimum. Relatively small bonding strengths may be sufficient since only the position of the rods has to be secured during handling.

A particularly important application may be to the use straight support elements with the insets described above. After the rods are inserted in a mesh reinforcement fashion, a final shape of the sifting device may be produced by subsequent bending, e.g., through cylindrical rolling of the support elements. In a same manufacturing step, the rods may be locked in and achieve a stability required for a remainder of the manufacturing process. Further reductions in production costs may be possible if the insets of the support elements are designed vertical insertion of the rods, e.g., by compression force, instead of pushed in from the side. Up to completing the manufacturing process, locking of the rods in the support elements may, but need not, take place by deforming of the support elements.

Accordingly, the present invention may be directed to a process for manufacturing a sifting device having slit-shaped openings. The process may include forming a plurality of insets in a support element; shaping a plurality of rods for insertion into the insets to be securely held in a position in the support element during subsequent manufacturing; inserting the rods substantially parallelly into the insets and forming a filtering gap between each inserted rod; and permanently bonding each rod in the respective inset with a bonding agent.

According to another feature of the present invention, the process may further include forming the slit-shaped openings to be less than or equal to approximately 3 mm wide at a narrowest point.

According to another feature of the present invention, the process may further include forming the slit-shaped openings being less than or equal to approximately 0.4 mm wide at the narrowest point.

According to still another feature of the present invention, the process may further include shaping the insets to include a first opening tapering to a predetermined depth and a second opening that expands from the predetermined depth.

According to yet another feature of the present invention, the process may further include shaping the rod to include a cross-sectional area having a triangular shape and a rounded portion for coupling to the support element.

According to a further feature of the present invention, the process may further include shaping and positioning the rods to form the slit-shaped openings that begins with a narrowest point to create a cross-sectional flow that widens in a flow direction.

According to another feature of the present invention, the process may further include the permanently bonding including a solder material. Further, the process may include soldering the rod into the inset at a temperature below 900° C. Alternatively, the process may include soldering at a temperature of over 900° C. and producing a high vacuum.

According to a further feature of the present invention, the process may further include the permanently bonding may include an adhesive. Further, the process may include maintaining a reaction temperature below approximately 200° C. at a bonding location.

According to another feature of the present invention, the process may further include the permanent bonding may include welding.

According to still another feature of the present invention, the process may further include deforming the support element upon insertion of the rod, such that the deformed state include an intended form. Further, the process may include fixing the rods within respective insets by the deformation of the support element, and bending a substantially straight support element into a ring or ring segment after inserting the rods.

The present invention may be directed to a sifting device that includes a plurality of slit-shaped openings for at least one of sorting and filtering fiber pulp suspensions, a support element that includes a plurality of insets for sorting and filtering the fiber pulp suspensions, and a plurality of substantially parallel rods in which the rods are securely held within the support element. A slit-shaped opening may be formed between the rods and the rods may be permanently bonded within the insets with a bonding agent.

According to another feature of the present invention, the rods may include a drawn profile.

According to another feature of the present invention, the rods may include a rolled profile.

According to another feature of the present invention, the rods may be locked into the insets by press fitting.

According to a further feature of the present invention, each slit-shaped opening may include an increasing cross-section in a flow direction.

According to a still further feature of the present invention, at least one deflection device may move substantially perpendicular to an extent of the slit-shaped openings.

According to still another feature of the present invention, an exposed surface of each rod may be formed at a predetermined angle to the at least one deflection device.

The present invention may be directed to a process for manufacturing a sifting device having a plurality of sifting slits. The process may include forming a plurality of insets in a support element; inserting a plurality of rods into the insets to be substantially parallel to each other and to be securely held in the support element; and permanently bonding the rod in the respective insert.

According to another feature of the present invention, the inserting may include a press fitting of the rod within the insert.

According to another feature of the present invention, the forming may include forming a first portion having tapering gap to a predetermined distance and forming a second portion having an increasing size coupled to the taper gap at the predetermined distance.

According to another feature of the present invention, the process may further include shaping a rod to have a shape substantially similar to the shape of the insert.

According to another feature of the present invention, the process may further include shaping a rod having a first section having a substantially triangular shape and a second section having a circular shape, the second shape being coupled to the first shape.

According to another feature of the present invention, the forming may include one of laser welding and electroerosion.

According to another feature of the present invention, the inserting may include deforming the support element.

Other exemplary embodiments and advantages of the present invention may be ascertained by reviewing the present disclosure and the accompanying drawing.

BRIEF DESCRIPTION OF THE DRAWINGS

The present invention may be further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the invention may be embodied in practice.

Figure 1A:
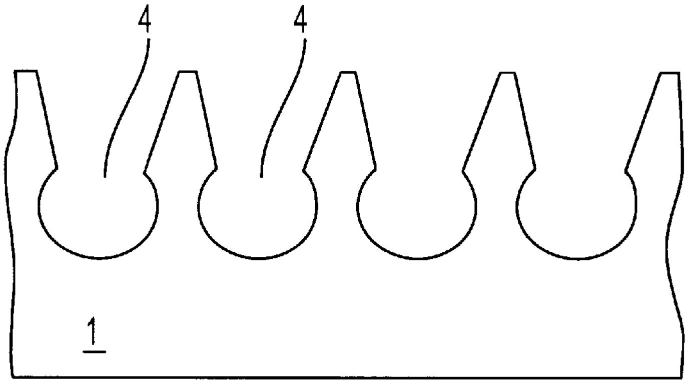
FIGS. 1*a*–1*c* illustrate schematic manufacturing steps according to the process of the present invention.
Figure 1B:
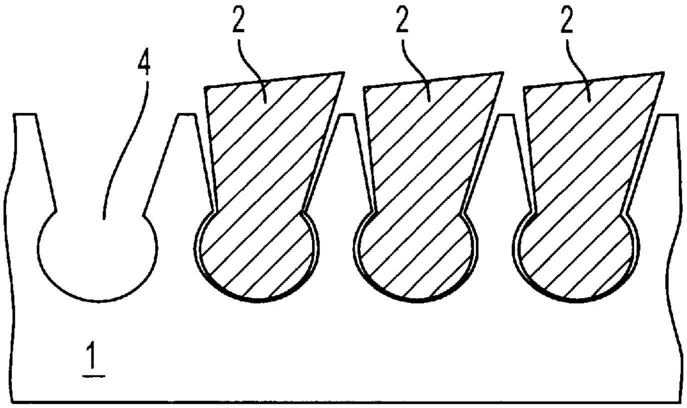
Figure 1C:
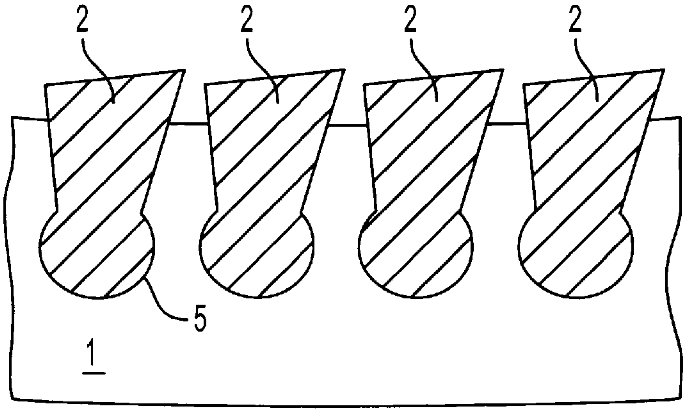

FIGS. 1*a*–1*c* illustrate, in general, the manufacturing process according to the present invention.

In FIG. 1*a*, a portion of a support element 1 has been formed that includes a plurality of insets 4. Insets 4 may be produced in support element 1, e.g., via laser welding. If greater precision is desired, insets 4 may be produced, e.g., via electroerosion. The portion of support element 1 is only for the purposes of explanation and it is noted that, as with conventional sifting devices, the support element may include a large number of insets 4.

Rods 2, e.g., steel or steel alloy, may be inserted into insets 4, as illustrated in FIG. 1*b*. The shape of insets 4 may allow for some extra space to remain between inserted rod 2 and the edges or walls of insert 4. This extra space may facilitate the insertion of rods 2. It is noted that the extra space adjacent rod 2, i.e., after insertion in insert 4, may be somewhat exaggerated for the purpose of explanation, and that the space need not be as large as shown in FIG. 1*b*. Rods 2 may include a base portion, e.g., a circular portion, and a pair of diverging sides, e.g., somewhat triangular, extending from the base portion. Insets 4 of support element 1 may be formed to receive the base portion and the diverging sides and may include locking portions to retain or securely hold the base portion after insertion of rod 2 and prevent the rods from falling out. Support element 1 may be deformed in a manner so that rods 2 may be firmly fixed or secured in place. Upon insertion, the devices may be utilized in sifting processes or in fiber sorting/washing processes. In a sifting process, the rods may form gaps or sorting slits having a width of, e.g., less than approximately 2 mm. In the fiber sorting/washing process, the rods may form gaps or slits having a width of, e.g., between approximately 0.1 and 0.2 mm.

To increase the stability of rods 2 in support element 1, a permanent bond for retaining rods 2 within insets 4, e.g., by soldering, may be performed. FIG. 1*c* illustrates a bonding material 5, e.g., solder, that may form a sturdy permanent bond between rods 2 and the walls of insert 4. Thus, the bonding material fills the extra spaces to secure rods 2 within support element 1. The bonding process may include any known process, e.g., high-vacuum soldering, which may utilize high temperatures between approximately 1000° C. and 1200° C., and soldering at temperatures between approximately 1000° C. and 1200° C., however it is also contemplated that the soldering process may occur at below approximately 900° C. Alternatively, the permanent bonding may be made, e.g., with an adhesive that utilizes a reaction temperature, e.g., below 200° C. at the bonding location.

Figure 2:
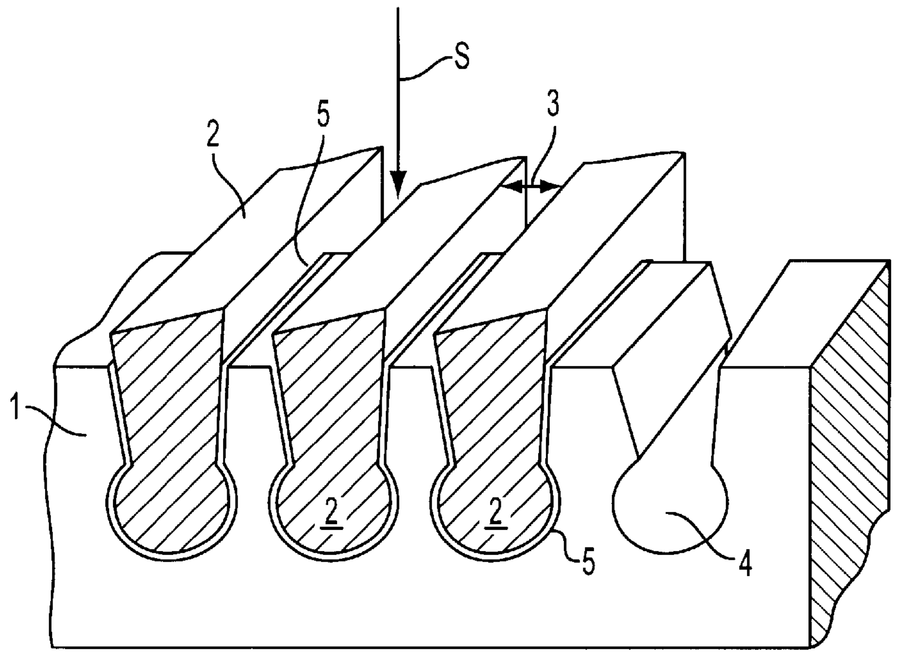
FIG. 2 illustrates a portion of sifting device in accordance with the present invention.

FIG. 2 illustrates a perspective view of a portion of support element 1 after the permanent bonding of rods 2 within insets 4. By the above process steps, a slit sieve may be produced that includes a plurality of slits 3 that allow a filterable fluid to pass through in a flow direction S. In use, particles having a size that exceeds a width of slit 3 do not pass through slit 3, and are, therefore, removed. For ease of explanation, one inset 4 is illustrated without rod 2 and bonding agent 5, e.g., solder, welding material, or glue, is illustrated by a bold line. A stable permanent bond between contact surfaces of rods 2 and the walls of insets 4 may develop and may significantly increase a degree of stability of the sifting device. According to the present invention, even in situations in which no optimal rod cross-sectional area has been selected for the insertion, because a special shape for rods 2 may be required by the sorting routine, stability may still be sufficient. As shown, the gaps or slits formed between the inserted rods may, e.g., be somewhat triangular in shape. Further, in certain processes a widest portion of the gap width may be, e.g., no greater than approximately 3 mm. Alternatively, other process may utilize a widest portion of the gap width of, e.g., no greater than approximately 0.4 mm.

Figure 3:
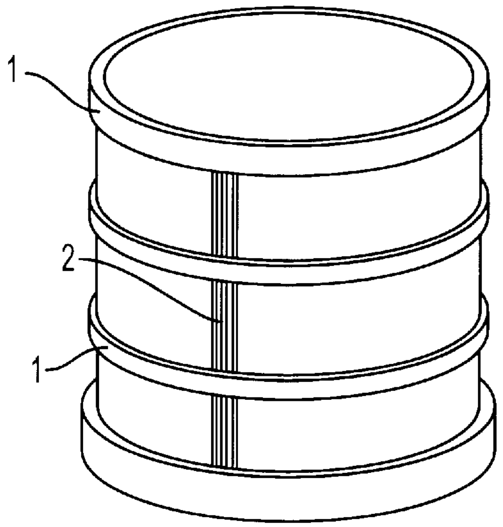
FIG. 3 illustrates a cylindrical sieve basket.

In accordance with FIG. 3, a sifting device manufactured in accordance with the present invention may be configured as a cylindrical strainer (or basket) that may be held together by a plurality of ring-shaped support elements 1. While the illustration only shows a portion of rods 2 that may be inserted to point radially inside the ring of support element 1. Alternatively, rods 2 may be inserted to point radially outward from the support element 1 ring.

Figure 4:
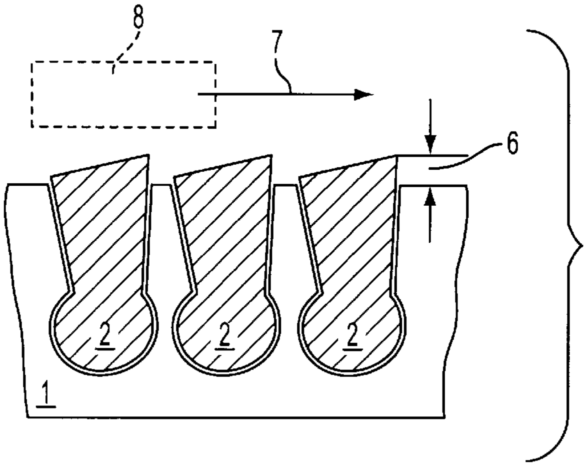
FIGS. 4–6 illustrate a variant of the rods and their arrangement with respect to a support element.

A penetration depth of rods 2, i.e., into support element 1 may be determined by requirements for the environment in which the slit sieve is to be utilized and by manufacturing options. FIG. 4 illustrates an embodiment of the present invention in which rods 2 may be almost entirely countersunk within support element 1. This particular arrangement may provide for a particularly secure bond of rod 2 to support elements 1.

In many instances, it may be advantageous if the surfaces of rod 2 are oriented toward an incoming flow, e.g., a fiber pulp suspension, at an angle inclined in a direction of movement 7 of a deflector plate or plow 8 (indicated by dashed lines) to create, on a trailing edge of rod 2, an offset 6. At this location, turbulence, which may be created by movement of deflector plate 8 passing rods 2, may improve a deflection/removal effect in the suspension. In accordance with this feature of the present invention, "deflection/removal" may mean that a pulp-water suspension may be sufficiently fluidized and rejected particles may be removed from the sieve area as quickly as possible so that the sieving surface may be capable of further sifting/filtering without interruption.

Figure 5:
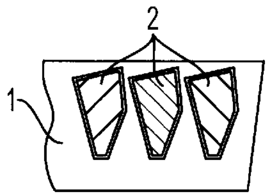
Figure 6:
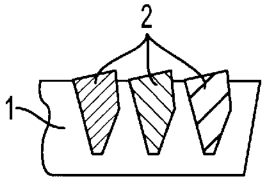

FIG. 5 illustrates an alternative arrangement of insets 4 in support elements 1. That is, the insets may be formed as openings. In this alternative, rods 2 may be inserted sideways into support element 1. Thus, rods 2 may be retained within insets 4 without deformation of support element 1, e.g., by press fitting or shrink fitting. This alternative may be particularly useful, e.g., when narrow fit tolerances exist or when parts to be joined parts are at different temperatures during assembly. The predetermined shapes of rods 2 may be selected according to a predetermined application criteria, i.e., sorter technology, of the sifting device. FIG. 6 illustrates another alternative arrangement for the insets in which rods 2 may be inserted, e.g., sideways.

Figure 7:
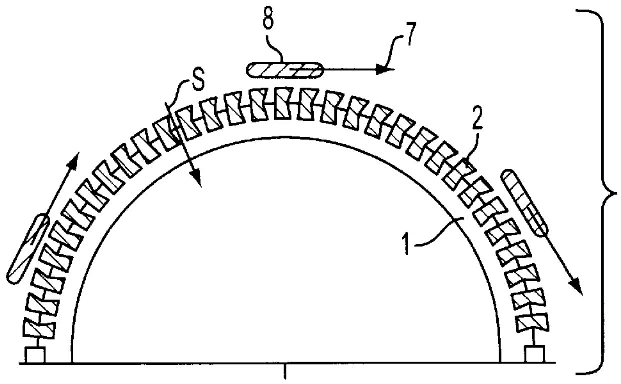
FIG. 7 illustrates a portion of a half-shell sieve.

FIG. 7 illustrates a portion of a half-shell sifting device in which an arrangement may be selected in which rods 2 may be inserted to extend radially outward from support element 1. Stabilization may be achieved by forming semi-circular support elements 1 by elastically bending support element 1 and releasing support element 1 after insertion of rods 2.

It may be further understood that a choice of rod shapes and cross-sections and the manner of insertion the rods into the support elements may lead to a large number of options in the design of the filtering slit.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A process for manufacturing a sifting device having slit-shaped openings, the process comprising:

forming a plurality of insets in a support element, and shaping the insets to comprise a first opening tapering to a predetermined depth and a second opening that expands from the predetermined depth;

shaping a rod for insertion into the insets to be securely held in a position in the support element during subsequent manufacturing;

inserting the rods to be substantially parallel in the insets, deforming the support element after insertion of the rods, such that the deformed state comprises an intended form, fixing the rods within respective insets by the deformation of the support element, and forming a filtering gap between the inserted rods; and permanently bonding the rods in the insets with a high temperature bonding agent.

2. The process according to claim 1, further comprising forming the slit-shaped openings to be less than or equal to approximately 3 mm wide at a narrowest point.

3. The process according to claim 2, further comprising forming the slit-shaped openings being less than or equal to approximately 0.4 mm wide at the narrowest point.

4. The process according to claim 1, further comprising shaping the rod to comprise a cross-sectional area having a triangular shape and a rounded portion for coupling to the support element.

5. The process according to claim 1, further comprising shaping and positioning the rods to form the slit-shaped openings that begins with a narrowest point to create a cross-sectional flow that widens in a flow direction.

6. The process according to claim 1, the permanently bonding comprising a solder material.

7. The process according to claim 6, further comprising soldering the rod into the inset at a temperature below 900° C.

8. The process according to claim 6, further comprising producing a high vacuum and hard soldering at a temperature of over 900° C.

9. The process according to claim 1, the permanent bonding comprising welding.

10. The process according to claim 1, further comprising bending a substantially straight support element into a ring or ring segment after inserting the rods.

11. The process according to claim 1, the permanently bonding comprising one of hard soldering and brazing.

12. A process for manufacturing a sifting device having a plurality of sifting slits comprising:

forming a plurality of insets in a support element;

forming each inset with a first portion having a gap tapering to a predetermined distance and forming each inset with a second portion having an increasing size coupled to the tapering gap at the predetermined distance;

inserting a plurality of rods into the insets to be parallel with each other and deforming the support element so that said rods are securely held in position in the support element;

permanently bonding the rod into the respective inset with a high temperature bonding agent.

13. The process according to claim 12, the inserting comprising a press fitting of the rods within the insets.

14. The process according to claim 12, further comprising shaping a rod to have a shape substantially similar to the shape of the inset.

15. The process according to claim 12, further comprising shaping a rod having a first section having a substantially triangular shape and a second section having a circular shape, the second shape being coupled to the first shape.

16. The process according to claim 12, the forming comprising one of laser welding and electroerosion.

17. The process according to claim 12, the permanently bonding comprising one of hard soldering and brazing.

18. A process for manufacturing a sifting device having a plurality of sifting slits comprising:

providing an elastically deformable support element;

forming a plurality of insets in said support element;

elastically deforming said support element;

inserting a plurality of rods into the insets while said support element is elastically deformed, said plurality of rods to be parallel with each other; and releasing said support element so that said support element returns to an undeformed position such that said rods are securely held in position in said support element; and permanently bonding said rods into a respective inset of said support element with a high temperature bonding agent.

19. The process according to claim 18, the forming comprising forming a first portion having tapering gap to a predetermined distance and forming a second portion having an increasing size coupled to the taper gap at the predetermined distance.

20. The process according to claim 18, further comprising shaping a rod to have a shape substantially similar to the shape of the inset.

21. The process according to claim 18, further comprising shaping a rod having a first section having a substantially triangular shape and a second section having a circular shape, the second shape being coupled to the first shape.

22. The process according to claim 18, the forming comprising one of laser welding and electroerosion.

23. The process according to claim 18, wherein said bonding comprises one of hard soldering and brazing.

24. The process according to claim 18, wherein said elastically deformable element is configured to have a semi-circular shape in an undeformed condition.

* * * * *